(12) United States Patent
Vollmer et al.

(10) Patent No.: US 7,019,636 B2
(45) Date of Patent: Mar. 28, 2006

(54) ELECTRONIC SYSTEM WITH A MULTIPLE ACCESS PROTOCOL AND METHOD OF MULTIPLE ACCESS

(75) Inventors: Vasco Vollmer, Holle (DE); Wolfgang Detlefsen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 704 days.

(21) Appl. No.: 10/223,016

(22) Filed: Aug. 16, 2002

(65) Prior Publication Data

US 2003/0048183 A1    Mar. 13, 2003

(30) Foreign Application Priority Data

Aug. 21, 2001   (DE) ................................ 101 40 849

(51) Int. Cl.
   *G08B 23/00*   (2006.01)
(52) U.S. Cl. ...................... 340/517; 340/505; 340/506; 340/507; 340/3.21; 340/3.1
(58) Field of Classification Search ................ 340/517, 340/505, 506, 507, 508, 3.2, 3.21, 3.1, 3.41, 340/3.5, 3.51, 286.02
   See application file for complete search history.

(56) References Cited

U.S. PATENT DOCUMENTS

| 5,481,259 | A | * | 1/1996 | Bane ................... 340/870.03 |
| 6,901,066 | B1 | * | 5/2005 | Helgeson ................. 370/348 |

FOREIGN PATENT DOCUMENTS

GB    2 236 606 A    4/1991

OTHER PUBLICATIONS

Alec Woo et al: "A Transmission Control Scheme for Media Access in . . . " The Seventh Annual International Conference on Mobile Computing and Networking, Jul. 16-21, 2001, pp. 221-235.
"Computernetzwerke" by A.S. Tannenbaum, Prentice Hall, 1998, Kapitel 4.2., pp 272-302.
"Mobilfunknetze Und Ihre Protokolle", by B. Walke, Band 1, Teubner, Stuttgart, 1998, pp. 100-124.

* cited by examiner

*Primary Examiner*—Daryl C. Pope
(74) *Attorney, Agent, or Firm*—Michael J. Striker

(57) ABSTRACT

The electronic system, especially a security system, includes a number of different units that access a network according to a multiple access protocol, which is designed to minimize collisions between frames while reducing bandwidth requirements. The units may monitor different spatial regions according to several different criteria. Respective units that monitor according to correspondingly different criteria in a given spatial region may be assembled into one group and units that monitor different spatial regions but according to the same criterion may be assembled into another group. Each of the units of the one group are provided access to the network in one concurrent time slot, while the units of the other group are provided access to the network in a different concurrent time slot.

22 Claims, 3 Drawing Sheets

ELECTRONIC SYSTEM WITH A MULTIPLE ACCESS PROTOCOL AND METHOD OF MULTIPLE ACCESS

BACKGROUND OF THE INVENTION

1. Field of the Invention

The present invention relates to an electronic system comprising a plurality of units, devices or sets, which access a network by means of a multiple access protocol and also relates to a suitable method for multiple access to the network and to a computer program for performing the method for multiple access.

2. Description of the Related Art

Different multiple access protocols are known in the state of the art. A review of the different multiple access protocols is provided in "Computer Networks" by Andrew S. Tannenbaum, Prentice Hall, 1998, especially chapter 4.2, pp. 272 and following.

In the so-called ALOHA system the channel assignment occurs so that different users are uncoordinated during concurrent use of a single channel. Pure ALOHA and subdivided ALOHA should be distinguished from each other; in a pure ALOHA method there can be collisions between frames during multiple access. However because of the acknowledgement possibilities in broadcast technology a user can always establish, whether the frame to be transmitted would be destroyed, since the user hears the corresponding messages in the channel.

If the frame would be destroyed, the user waits for a predetermined time interval and then transmits it. Such systems, in which the user uses a common channel so that collisions can occur, are generally known as concurrent systems (contention systems).

In the subdivided ALOHA method the time is partitioned into individual intervals. Each interval corresponds to a frame. In this process in contrast to pure ALOHA the user does not immediately transmit as soon as a line flyback is detected. Instead of that the user waits until the next time slot. In so far as it is a matter of a slotted ALOHA method, subdivided ALOHA is a time-discrete variation of a pure ALOHA method.

Furthermore different methods for solving the problem of collisions are known in slotted ALOHA methods, e.g. the so-called exponential-backoff. A detailed explanation of this latter method is found in B. Walke, "Mobile Nets and their Protocols—Volume 1", Teubner, Stuttgart, 1998.

No methods, which operate according to a multiple access protocol, are used in security networks for monitoring buildings and plants, e.g. for fire and break-in protection, or in other safety-critical networks. In this type of system a definite fixed time slot is assigned to each unit or set in the network. A suitable frame may also have a number of time slots, which correspond to the number of sets or units of the network.

Thus it is guaranteed that each set or unit of the network can access the network during each interrogation cycle. This however is disadvantageous because the bandwidth of the network must be high in order to achieve a short access time, since all the units must have a dedicated time slot in each time frame. The so-called latency time for access of a unit to the network thus becomes comparatively long when the bandwidth of the network is insufficient.

SUMMARY OF THE INVENTION

It is an object of the present invention to provide an improved electronic system of the above-described type, especially an improved security system, with a multiple access protocol for units, devices or sets of the system to a network, in which the above-described disadvantages are at least reduced.

It is an additional object of the present invention to provide an appropriate improved method for multiple access of units, devices or sets of an electronic system to a network, which is embodied in an improved computer program product for multiple access.

This object and others, which will be made more apparent hereinafter, are attained in an electronic system comprising at least one first unit for a first spatial region and at least one second unit for a second spatial region and a network in which the at least one first unit and the at least one second unit are connected with each other, the first spatial region and the second spatial region being separate from each other, and a multiple access protocol for access of the at least one first unit and the at least one second unit to the network.

According to the invention the at least one first unit and the at least one second unit may be assigned to a common time slot (i.e. the same time slot) when the at least one first unit and the at least one second unit are located in different spatial regions. Alternatively the at least one first unit and the at least one second unit may be assigned to a common time slot (i.e. the same time slot) when they are of a different type, i.e. they test for different criteria.

Preferred embodiments of the electronic system and method of access according to the invention are described and claimed in the dependent claims appended below.

The claimed electronic system and method of access according to the invention provides an improved electronic system, especially an improved security system, which combines a band-width-efficient use of the network with a short latency time and a reliable access of the individual units to the network.

In a preferred embodiment of the invention certain units of the electronic system are combined into groups. Each unit of a single group is assigned to the same concurrent time slot.

The units of a group can, for example, be of the same type, which operate or monitor according to the same criterion, e.g. fire alarm, motion detector or break-in detection alarm. These units are typically distributed in areas to be monitored in different spatial regions. It is extremely unlikely however that the same criterion is fulfilled at the same time in the different spatial regions.

For example, a fire usually breaks out only in a certain location and not simultaneously in several locations, and similarly a break in will not occur simultaneously at many different locations of the observed areas or buildings. In the units, which monitor according to the same criterion and belong to the same group, thus simultaneous occurrences of the monitored criterion or event at the different locations or regions spatially separated from each other are not correlated with each other. A simultaneous occurrence in several regions or locations is probably extremely unlikely.

Although these units or sets of the same group are assigned only one concurrent time slot, it is nearly completely out of the question that concurrent access of different units of this group would be required in the same time slot for activating a warning.

In another embodiment of the invention units of different type are combined into one group. For example these different units can include a fire alarm and a break-in detection alarm, which monitor the same region or space. The criteria monitored by the fire and break-in detection units are not correlated in the monitored region and it would probably be extremely unlikely that a fire and a break in would occur simultaneously. Although the units of this group are assigned the same time slot, it would be nearly completely out of the question that concurrent access would be required by different units during the same time slot. Thus it is guaranteed that a fire alarm or a break-in or burglar alarm can be transmitted with a short latency time.

The invention has the special advantage that the number of concurrent time slots can be reduced based on the intelligent assignment of the units of the electronic system to different groups. Thus either bandwidth may be saved or the latency time for access to the network may be drastically reduced.

The method of multiple access according to the invention is particularly advantageous in a system, in which alarm devices send out sporadic alarm messages and are regularly tested by a central unit to establish that they can be reached. For this purpose alarm messages are transmitted during a dedicated time interval, the so-called contention phase.

The contention phase is divided into a number, n, of concurrent time slots, in which a respective number, m, of units access the network concurrently during a time slot. Which units have concurrent access in the time slot depends on the topology of the net, on the unit type and/or on the configuration of the system.

During selection of the unit assignment to the concurrent time slot according to topology it is especially advantageous that those units are allowed access jointly to the time slot, which are physically separated from each other. This is because alarm devices, which are widely separated from each other, are unlikely to be called upon to send out simultaneous alarms.

During selection according to unit type it is especially advantageous to assign different types of units to the same concurrent time slot, e.g. fire alarm units and burglary alarm units, since there is only a small chance that alarms would be issued simultaneously by both devices.

According to an additional preferred embodiment the method according to the invention is connected with an automatic configuration, in which the central unit determines the topology of the network and the type of units, which concurrently access a time slot. The units that access the same time slot participate in the network according to a calculation of an optimal access distribution by the central unit. The determination of the topology of the net by the central unit can occur by measurement of the signaling time of the different units. The unit type can, for example, be determined by data bank access or by direct interrogation of the units.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
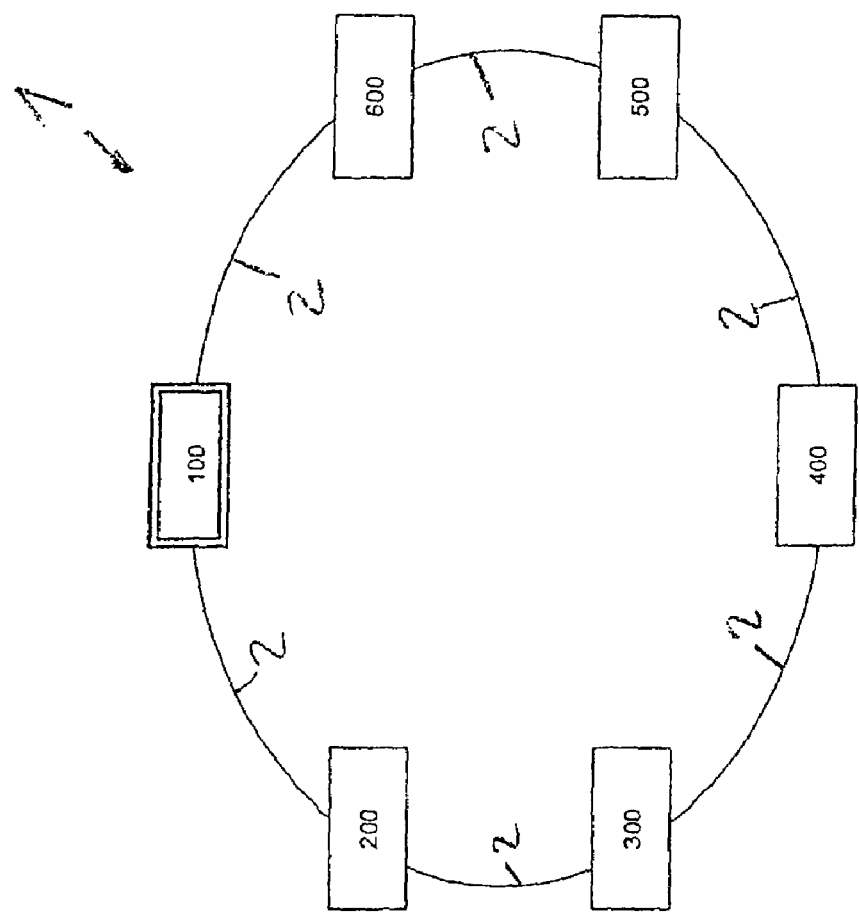
FIG. 1 is diagrammatic view of a preferred embodiment of the electronic system according to the invention.

FIG. 1 shows a network 1 with a central unit 100 and additional units 200 to 600, which are connected in a network by lines 2. The additional units 200 and 500 are fire alarm units and the units 300 and 600 are burglar alarm units or break-in detection alarm units. The unit 400 is a unit for transfer of signals to and from a telephone network. The fire alarms 200 and 500 are widely separated from each other in different parts of a building or other structure.

After activation of the electronic system according to FIG. 1 the central unit first performs an initialization phase for auto-configuration. All the additional units 200 to 600 are interrogated during this initialization phase.

Each of the additional units 200 to 600 is assigned a different address in the network 1. Furthermore the central unit 100 measures the signaling time from the central unit 100 to the concerned unit, in order to establish network topology. Then each of the units 200 to 600 signals its type to the central unit 100.

The central unit determines an optimum number of concurrent time slots, when the central unit combines the units into groups, which are assigned to those time slots. This determination is based on the topology of the network and the distribution of different types of units in the network that was determined by the central unit. The assignment of each unit to a concurrent time slot is transmitted to the unit by the central unit 100.

In the embodiment of FIG. 1 the central unit 100 combines the units 200 and 500 into the same group, since these units 200 and 500 monitor widely separated parts of a building or locations based on the same criterion. The corresponding monitoring in the different parts of the building will not be correlated with each other and simultaneous alarm activation of the units 200 and 500 in the different parts of the building are considered to be extremely unlikely. Furthermore the units 300 and 400 are combined by the central unit 100 into a group, because the concerned types of these units are very different from each other and thus collision of alarm signals from them is very unlikely.

The unit 600 is combined with no other units in a group, since there are special security concerns regarding this unit. For example, this can be because it handles monitoring a principle entrance for break-in. Suitable information that the unit 600 may not be combined with other units into a group, can be stored in the unit 600 itself. This information is then transmitted to the central unit 100 together with the interrogated unit type. However this information can also be stored in a data bank of the central unit 100.

Figure 2:
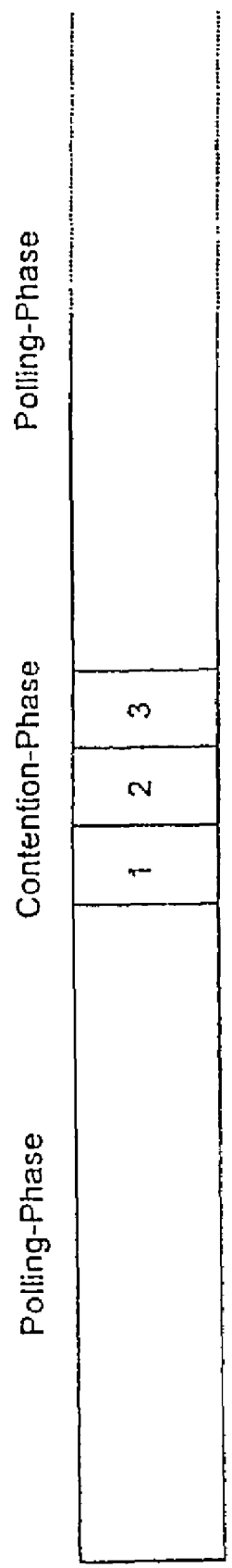
FIG. 2 shows the division of a frame into concurrent time slots.

From those considerations the central unit 100 determines that the optimum number of concurrent time slots is three FIG. 2 shows a suitable frame with so-called polling phases and a contention phase of a multiple access protocol. The contention phase has three concurrent time slots following each other in succession.

The central unit 100 (see FIG. 1) assigns, for example, the unit group including units 200 and 500 to a first concurrent time slot 1 and the second unit group including the units 300 and 400 to the concurrent time slot 2. In contrast, only one unit, namely the unit 600, is assigned to the concurrent time slot 3, since this unit requires a dedicated and exclusive concurrent time slot. In this way a concurrent access to the concerned time slot is mainly prevented, which is advantageous because of the special security concerns regarding this unit. Furthermore more than one contention phase can advantageously be provided, in order to further shorten the access time.

Figure 3:
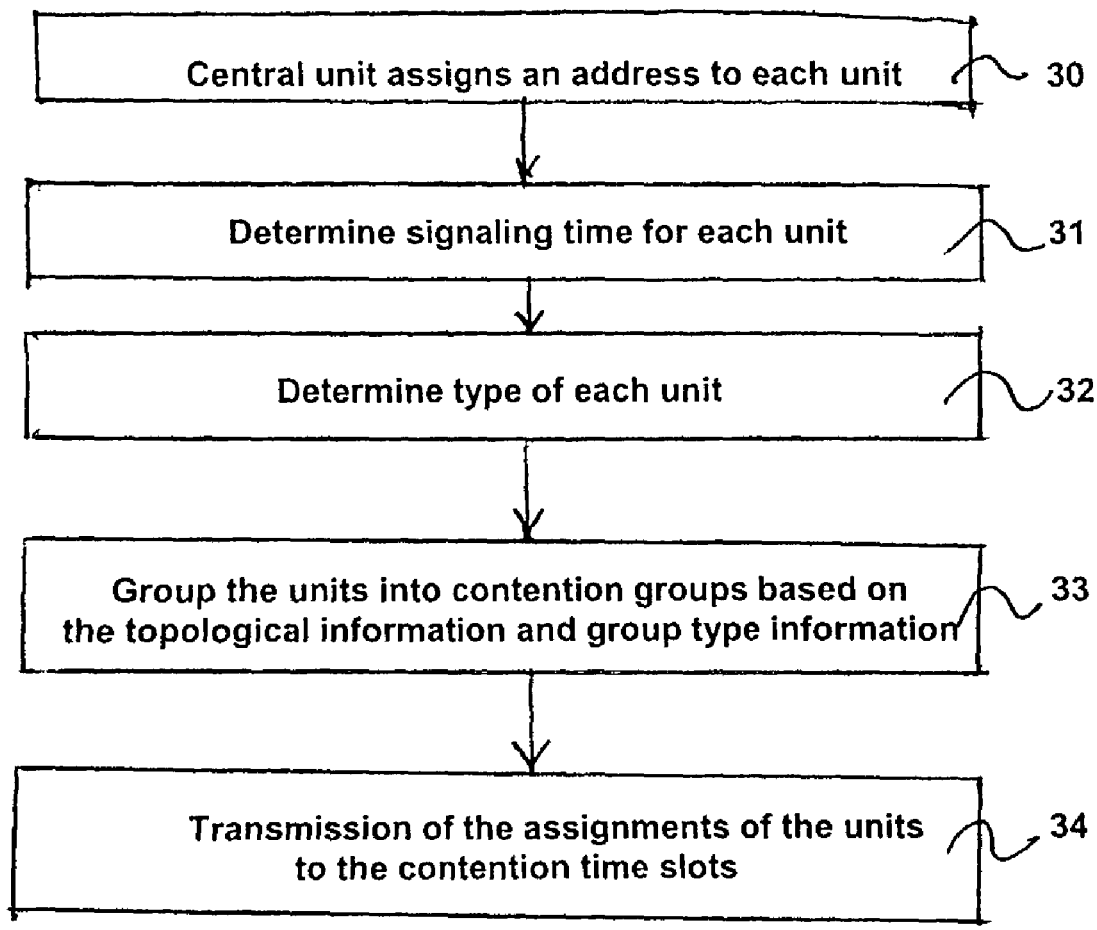
FIG. 3 is a flow chart for a preferred embodiment of a method for multiple access according to the invention.

FIG. 3 is a flow chart of a method according to the invention.

In step 30 the central unit 100 assigns a definite address to the respective unit of the electronic system during an initialization and auto-configuration phase, so that each unit is definitely identified in the network by the address.

In step 31 the central unit 100 determines the signaling time to each unit in the network, in order to determine an image or model of the network topology.

In step 32 the central unit determines the type of each unit. That means that the central unit 100 determines whether or not the unit is a fire alarm unit, a break-in alarm unit or burglary alarm unit, a motion detector or a transmission point unit for a telephone unit. Also a statement can be included regarding whether or not this unit may be combined with other units in a group, which is assigned to the same or a common time slot. The appropriate information can be stored in the individual units in a decentralized manner or can be retrieved from the central unit 100.

In step 33 the units are combined into different groups, so-called contention groups. Of course they are combined based on the topological information obtained in step 31 and the unit type information obtained in step 32. The combination of units into groups occurs so that the generation of alarm signals from the units of the same group is very unlikely. The division of units into groups is based on the observation that simultaneous generation of alarms is almost never required from the same type of units in different spatial regions or from different types of units.

In step 34 the assignment of each unit to a concurrent time slot, a so-called contention time slot, is transmitted to that unit. Accordingly the normal operation of the network can take place, for example for monitoring for fire and burglary.

The disclosure in German Patent Application 101 40 849.8 filed on Aug. 21, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for repeat transmission of messages in a centrally controlled communication network, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An electronic system comprising at least one first unit (200) for a first spatial region, at least one second unit (500) for a second spatial region, a network (1) in which each of the at least one first unit and the at least one second unit are connected with each other, the first spatial region and the second spatial region being separate from each other, and a multiple access protocol for access of each of the at least one first unit and the at least one second unit to the network, wherein at least one of said at least one first unit and at least one of said at least one second unit are assigned to a single concurrent time slot.

2. The electronic system as defined in claim 1, wherein said at least one first unit includes means for monitoring the first spatial region regarding a first criterion or condition and the at least one second unit includes means for monitoring the second spatial region regarding the first criterion or condition, and wherein the first spatial region and the second spatial region are separate from each other so that the presence of the first criterion or condition in the first spatial region is not correlated with the presence of the first criterion or condition in the second spatial region.

3. The electronic system as defined in claim 1, wherein said at least one first unit is a fire alarm unit, a motion detector or a break-in alarm unit and said at least one second unit is a fire alarm unit, a motion detector or a break-in alarm unit.

4. The electronic system as defined in claim 1, further comprising means for determining a topological distribution of said units connected in said network based on a determination of running time to establish which of said units is said at least one first unit or said at least one second unit and means for assigning at least two of said units to said single concurrent time slot when said at least two of said units are in respective different regions separate from each other.

5. The electronic system as defined in claim 1, further comprising means for determining respective monitoring criteria of said at least one first unit and at least one second unit and means for assigning said units for which said monitoring criteria are uncorrelated to a common concurrent time slot.

6. The electronic system as defined in claim 1, further comprising a central unit for assigning said at least one first unit and said at least one second unit to said single concurrent time slot and wherein said central unit has means for assigning a definite address to each of said units.

7. An electronic system comprising at least one first unit (300) for monitoring a spatial region for the presence of a first criterion, at least one second unit (400) for monitoring said spatial region for the presence of a second criterion, a network (1) in which the at least one first unit and the at least one second unit are connected with each other, and a multiple access protocol for access of the at least one first unit and that at least one second unit to the network, wherein at least one of said at one first unit and at least one of said at least one second unit are assigned to a single concurrent time slot.

8. The electronic system as defined in claim 7, wherein the presence of the first criterion and the presence of the second criterion are not correlated with each other.

9. The electronic system as defined in claim 7, wherein the at least one first unit is a fire alarm unit and the at least one second unit is a motion detector or a break-in alarm unit.

10. A method for accessing at least one first unit and at least one second unit to a network, wherein said at least one first unit includes means for monitoring a first spatial region and at least one second unit includes means for monitoring a second spatial region, wherein the first spatial region and the second spatial region are separate from each other, wherein the accessing takes place by means of a multiple access protocol, and wherein at least one of said at least one first unit and at least one of said at least one second unit are assigned to a single concurrent time slot.

11. The method as defined in claim 10, further comprising monitoring the first spatial region for a first condition or a first criterion by means of the at least one first unit and the second spatial region for the first condition or the first criterion by means of the at least one second unit and wherein the occurrence of the first condition or the first criterion in the first region is not correlated with the occurrence of the first condition or the first criterion in the second region.

12. The method as defined in claim 11, wherein the first criterion or the first condition is the occurrence of fire, a motion or a break-in.

13. A method for accessing at least one first unit for monitoring a spatial region according to a first criterion and at least one second unit for monitoring the spatial region according to a second criterion in a network connecting said at least one first unit and said at least one second unit, wherein the accessing takes place by means of a multiple access protocol, and wherein at least one of said at least one first unit and at least one of said at least one second unit are assigned to a single concurrent time slot.

14. The method as defined in claim 13, wherein said first criterion and said second criterion are not correlated with each other.

15. The method as defined in claim 13, in which said first criterion is the occurrence of fire and the second criterion is the presence of a motion or the occurrence of a break-in.

16. The method as defined in claim 13, further comprising assigning a definite address to each of the units in the network by means of a central unit; determining a topological distribution of the units in the network by means of the central unit; determining the respective criteria of the units for monitoring by the units; assembling respective units for monitoring the same criterion but which are located in corresponding different spatial regions separate from each other into a first group, assembling respective units for monitoring correspondingly different criteria not correlated with each other into a second group, assigning each of the units in the first group to a first concurrent time slot and assigning each of the units in the second group to a second concurrent time slot.

17. The method as defined in claim 16, wherein the determining of the topological distribution occurs by means of running time measurement.

18. The method as defined in claim 16, wherein said determining of the respective criteria of the units for monitoring occurs by retrieval of monitoring information from a data bank or by retrieval of said monitoring information from said units.

19. The method as defined in claim 16, further comprising transmitting respective messages to said units from said central unit and wherein said respective messages contain information regarding corresponding assignments of said units to said first group or said second group.

20. The method as defined in claim 13, further comprising connecting a third unit in the network, which can only be assigned by the multiple access protocol to a time slot to which no other units have been assigned, without concurrent access.

21. A computer program product comprising a computer system and a computer program stored in the computer system, whereby said computer system performs a method according to one of claims 13 to 20, when said computer program is executed.

22. A computer program product comprising a central unit of the network including the units and a computer program stored in the central unit, whereby said computer system performs a method according to one of claims 13 to 20 when said computer program is executed.

* * * * *